United States Patent [19]

Schroeder et al.

[11] 4,007,030
[45] Feb. 8, 1977

[54] PROCESS FOR THE SIMULTANEOUS MANUFACTURE OF PHOSPHORIC ACID OR THE SALTS THEREOF AND A COMPLEX MULTI-COMPONENT MINERAL FERTILIZER

[75] Inventors: Jerzy Schroeder, Wroclaw; Jerzy Synowiec, Gliwice; Tadeusz Zrubek, Krakow; Henryk Gorecki, Wroclaw; Zdzislaw Wolnicki, Warsaw; Roman Hnatowicz, Krakow, all of Poland

[73] Assignee: Przedsiebiorstwo Projektowania I Dostaw Kompletnych Obiektov Przemyslowych "Chemadx", Krakow, Poland

[22] Filed: Mar. 2, 1976

[21] Appl. No.: 663,074

[30] Foreign Application Priority Data

Mar. 6, 1975 Poland .................................. 178549

[52] U.S. Cl. ........................................ 71/40; 71/43; 71/47; 423/319; 423/320
[51] Int. Cl.² ........................ C05B 1/00; C05B 11/08
[58] Field of Search ................. 71/1, 34, 40, 43, 47; 423/319–321

[56] References Cited

UNITED STATES PATENTS

| | | | |
|---|---|---|---|
| 2,857,262 | 10/1958 | Graham | 71/39 |
| 2,942,967 | 6/1960 | Caldwell | 71/40 X |
| 3,172,751 | 3/1965 | Datin | 71/40 X |
| 3,241,944 | 3/1966 | Takeda et al. | 71/40 X |
| 3,697,246 | 10/1972 | Drechsel et al. | 71/40 X |

Primary Examiner—Frank A. Spear, Jr.
Assistant Examiner—Ferris H. Lander
Attorney, Agent, or Firm—Haseltine, Lake & Waters

[57] ABSTRACT

In the process according to the invention, raw phosphate rock is decomposed with an aqueous solution of sulfuric acid and ammonium sulfate recycled from the conversion step of phosphogypsum into chalk, and then the decomposition liquor stream is divided into a partial acid plant stream (Liquor I) to be converted into phosphoric acid and a partial fertilizer plant stream (Liquor II) to be processed to a multi-component mineral fertilizer. From the acid plant stream (Liquor I) constituting up to 30 per cent by weight of the total decomposition stream, ammonium sulfate is precipitated and introduced into the fertilizer plant stream (Liquor II), all the above mentioned processes of decomposition, separation and precipitation being carried out continuously.

Another embodiment of the process according to the invention, wherein the partial acid plant stream (Liquor I) constitutes a partial phosphate plant stream; the said stream comprising aqueous-organic solvent phosphoric acid solution after precipitation of impurities is neutralized with ammonia, alkali metal hydroxides or alkali metal carbonates to yield crystalline phosphate salts of high purity and a homogeneous mixture of organic solvent and water which may be easily separated by distillation.

4 Claims, No Drawings

PROCESS FOR THE SIMULTANEOUS MANUFACTURE OF PHOSPHORIC ACID OR THE SALTS THEREOF AND A COMPLEX MULTI-COMPONENT MINERAL FERTILIZER

The invention relates to a process for the simultaneous manufacture of phosphoric acid or the salts thereof and a mixed chemical fertilizer; the invention especially relates to the manufacture of phosphoric acid of high concentration and high purity, particularly used either for manufacture of feed phosphates used in cattle-breeding or for the special technical salts of phosphoric acid employed by industry and the simultaneous manufacture of a multi-component mineral fertilizer, containing mainly nitrogen, phosphorus and potassium at the required ratio, used in agriculture as a spring and autumn fertilizer. The invention also relates to a process for the simultaneous manufacture of phosphate salts and a mixed fertilizer in place of phosphoric acid itself: in the process crystalline phosphoric salts of high purity (Feed phosphates or special technical salts) are obtained simultaneously with a multi-component fertilizer.

A process is known for the manufacture of phosphoric acid based on continuous operation of:
- decomposition of phosphate rock with a solution containing ammonium sulfate and ammonium bisulfate;
- conversion of phospho-gypsum waste into ammonium sulfate and chalk,
- precipitation of neutral ammonium sulfate from the phosphate rock decomposition products by addition of a polar organic solvent under specified conditions;
  (the organic solvent must be miscible with water and phosphoric acid in all proportions; the weight ratio of the organic solvent to the decomposition liquor ranges from 0.8 to 1.6; temperature is kept below 30° C);
- thermal decomposition of said precipitated neutral ammonium sulfate,
- recycling of the resulting ammonium bisulfate to the phosphate rock decomposition step,
- purification of the mixture composed of phosphate rock decomposition liquor and polar organic solvent by adding substances containing calcium salts.

Still another process is known for the manufacture of a mixed mineral fertilizer containing mainly nitrogen, phosphorus and potassium, based on a continuous operation of:
- decomposition of phosphate rock with a solution of sulfuric acid and ammonium sulfate in the molar proportion from 0.7 to 1.0,
- conversion of phospho-gypsum waste into ammonium sulfate and chalk by treatment with aqueous ammonium carbonate,
- addition to the waste liquor a potassium salt in an amount sufficient to maintain the weight ratio of $P_2O_5$-$K_2O$ from 0.8 to 1.2,
- ammonization of the reaction mixture with gaseous ammonia in an amount sufficient to maintain the weight ratio of $N/P_2O_5$ from 0.3 to 0.9 and
- partial or full recycling of ammonium sulfate obtained from waste phospho-gypsum conversion to the phosphate rock decomposition step.

The advantage of the first method lies in the manufacture of the phosphoric acid of such concentration and purity that it can be used directly in the manufacture of feed phosphates for cattle-breeding and of special technical salts for industrial use which — in comparison to conventional methods — makes it possible to avoid the necessity of purification and concentration of the phosphoric acid obtained; another advantage of said method lies in the elimination of the necessity of using sulfuric acid in the manufacture of phosphoric acid. The advantage of the other method lies in the manufacture of a multi-component mineral fertilizer of sufficient nitrogen content to be used in agriculture without the necessity of adding urea as the nitrogen controlling agent in the manufacturing process — which — in comparison to the conventional methods — allows for reduction of capital investment costs of a complex fertilizer plant by about 50 per cent, owing to avoidance of erecting a parallel urea plant; another advantage of this method lies in the reduction of the quantity of sulfuric acid used in the process of mixed mineral fertilizer by more than 30 per cent.

A common advantage of both the methods as compared with conventional method consists in the elimination of very troublesome phospho-gypsum waste, the storage and disposal of which encounter more and more difficulties, owing to stringent restrictions with respect to industrial liquid and solid wastes, - by conversion of phospho-gypsum into chalk which may be used in agriculture or in the building of soda industries.

Nevertheless, both methods also exhibit some defects and drawbacks. The disadvantage of the first method lies in the high power consumption for the crystallization of ammonium sulfate from aqueous solution formed in the phosphogypsum conversion step and for the thermal decomposition of neutral ammonium sulfate to ammonium bisulfate; another disadvantage of the method involves the necessity of using special stainless steels and acid-proof materials for the unit used for ammonium sulfate thermal decomposition, as ammonium sulfate is highly corrosive under these circumstances. The disadvantage of the second method lies in the impossibility of producing phosphoric acid alone used as a feedstock for the manufacture of feed phosphates and special technical salts.

The present invention constitutes a combination of both known methods into a new one, which makes possible the simultaneous manufacture of phosphoric acid or the salts thereof and a multicomponent mineral fertilizer. The process combines the advantages of both the previous methods and eliminates or reduces the inconveniences inherent in each of them separately.

The object of this invention is to provide a process wherein any known phosphate material may be used as a feedstock, for example, a type of apatite concentrate or any kind of phosphate rock and among them also a phosphate-bearing material that until now could not be processed by the known methods because of the excessive content of contaminants, like iron or aluminum or because of too low a concentration of phosphorus; after decomposition of the phosphate-bearing material carried out by the known method with an aqueous solution of ammonium sulfate and sulfuric acid at a molar ration of $(NH_4)_2SO_4$ to $H_2SO_4$ ranging from 0.7 to 1.0, and after filtering off (purification) phosphogypsum formed, the total decomposition of liquid stream, containing mainly phosphoric acid, ammonium biphosphate and ammonium sulfate is divided into two separately treated streams; a partial acid plant stream (Liquor I) processed into phosphoric acid, and a partial fertilizer plant stream (Liquor II) processed into a mixed mineral fertilizer (complex fertilizer); since the only by-product of the simultaneous manufacture of phosphoric acid and the complex fertilizer is to be chalk fertilizer, a corresponding mutual ratio of the magnitudes of both partial streams must be preserved, namely the partial acid plant stream (Liquor I) must not exceed 30 per cent by weight of the total decomposition liquor stream; this separation of the total decomposition liquor stream into two separate streams constitutes the first principal aspect of the new method, followed by:

precipitation, filtration and introduction of ammonium sulfate contained in the partial acid plant stream (Liquor I) into the partial fertilizer plant stream (Liquor II).

The partial acid plant stream is subjected to further treatment by known methods, namely the phosphogypsum formed, after filtering off from the decomposition liquor is converted by treatment with ammonium carbonate solution to chalk and about 40 per cent ammonium sulfate solution. After separation of chalk by filtration, sulfuric acid is added to the filtrate in an amount sufficient to preserve a molar ratio of $(NH_4)_2SO_4$ to $H_2SO_4$ of from 0.7 to 1.0 and to get a proper reaction solution to be used for decomposition of phosphate rock. Then to this partial acid plant stream more sulfuric acid is added in such a quantity as to provide a molar ratio of N to $SO_3$ equal to about 2.0 and after adiabatic cooling, a polar organic solvent completely miscible with water and phosphoric acid, such as alcohols, among them methanol, ethanol, propanol, butanol, isopropanol, etc. or ketones, among them acetone, etc. or mixtures thereof, is added in any mutual weight proportions but preserving the quantitative volume ratio of the solvent to the partial acid plant stream (Liquor I), ranging from about 0.8 to 1.6 and keeping the temperature below 30° C;— then neutral ammonium sulfate and other mineral impurities are precipitated from the organic solvent — aqueous phosphoric acid solution and as there remains a slight amount of sulfate ions in the solution, they are removed, by precipitation with calcium salts: e.g. waste chalk, milk of lime, calcium phosphate. Then, as indicated above, as the second essential aspect of the process according to the invention, ammonium sulfate is precipitated with the said organic solvents from the partial acid plant stream (Liquor I), filtered off together with mineral impurities from the organic solvent-phosphoric acid solution and introduced to the partial fertilizer plant stream (Liquor II). The organic solvent-aqueous solution is subjected to distillation to yield very pure phosphoric acid of the desired concentration (up to about 72 per cent by weight of $P_2O_5$) and the organic solvent is recycled to the precipitation step. In another embodiment of the invention the organic solvent-aqueous phosphoric acid solution in the partial acid plant stream (Liquor I) which in this embodiment of the invention constitutes again a partial stream for the acid plant, is directly subjected to neutralization with ammonia, alkali bases or alkali metal carbonates, such as sodium or potassium, but preferably with sodium or potassium hydroxide, to yield pure crystalline phosphoric salts and a homogeneous solution of water and the organic solvent. This modification of the process is more advantageous since separation of the organic solvent water mixture by fractional distillation is less power consuming.

The partial fertilizer plant stream (Liquor II) is also treated by the known method, i.e. ammonization, and the heat of reaction is used to evaporate water. Then — this feature has been already presented above as an essential element of the new process, the fertilizer plant stream is mixed with precipitated ammonium sulfate, accompanied by mineral impurities from the partial acid plant stream (Liquor I) and with potassium salts. This mixture is granulated and dried to produce a mineral multicomponent fertilizer of the NPK type.

The process according to the invention provides high operation flexibility consisting in the possibility of introducing changes in the products slate, namely of phosphoric acid, hence feed phosphates or technical salts, on the one hand, and of multi-component mineral fertilizers on the other, with the same quantity of decomposed phosphate rock as the feedstock. The method also provides a high phosphate yield not lower than 98 per cent, all the end products included. The process for the production of phosphoric acid according to the invention provides optimum power consumption, by eliminating the power consuming step of thermal decomposition of neutral ammonium sulfate and its crystallization from aqueous solution, involving evaporation of considerable quantities of water. Meanwhile in the manufacture of phosphoric acid, particularly as an intermediate for the production of feed phosphates the process according to the invention may save up to 25 per cent $P_2O_5$, in comparison with the conventional dihydrate methods where it is necessary to concentrate the weak acid produced and to purify it in a multi-stage process. Both in the manufacture of phoshoric acid and multi-component mineral fertilizer, the process according to the invention allows for reduction of the sulfuric acid consumption by more than 30 per cent, as compared with the conventional methods.

The process for the simultaneous manufacture of phosphoric acid and a mineral multi-component fertilizer according to the present invention will be further illustrated in the following examples, which in no way limit the scope of the invention.

EXAMPLE I

In an overflow reactor a phosphate rock containing 31.5 per cent $P_2O_5$ was decomposed at a rate of 1000 kg/hour, using 3680 kg/hour of an aqueous solution containing 19.16% sulfuric acid and 28.15% ammonium sulfate. Decomposition was carried out at 90° C and the reagents were fed to the reactor at such a flow rate that the retention time of the pulp in the reactor was 5 hours, which ensured at least 98 per cent decomposition of the phosphate rock. Phospho-gypsum formed in the decomposition step was filtered, washed and treated with ammonium carbonate to yield after filtration and washing 1145.5 kg/h of fertilizer chalk, having a 70 per cent by weight $CaCO_3$ content and 2974.8 kg/h of ammonium sulfate aqueous solution of 34.82 per cent by weight concentration.

The said solution after treatment with 705.2 kg/h of sulfuric acid was recycled to the decomposition step. The overall decomposition stream was filtered and the filtrate in the amount of 2497.3 kg/h, consisting mainly of ammonium phosphate, ammonium sulfate and ammonium bisulfate, was divided into two streams, one of which, a partial acid plant stream (Liquor I) was delivered to the phosphoric acid plant at the flow rate of 517.0 kg/h and the other, a partial fertilizer plant stream (Liquor II) was charged to a multi-component mineral fertilizer plant of the NPK type, at a flow rate of 1980.3 kg/h, the partial acid plant stream (Liquor I) was adiabatically cooled and then methanol was metered at a rate of 711.0 kg/h, at 15° C for about 2 hours to effect precipitation. Because of the high content of sulfate ions in the methanol solution of phosphoric acid, 6.6 kg/h of chalk, obtained in the conversion step, was metered to the pulp. The mixture was separated by centrifugation and an aqueous methanolic phosphoric acid solution containing 97.7 kg/h of the acid was obtained. The solution was subjected to distillation and phosphoric acid of up to 72 per cent by weight $P_2O_5$ was obtained. To the fertilizer plant stream (Liquor II) ammonium sulfate precipitated from the acid plant stream (Liquor I) at the rate of 166.5 kg/h and potassium chloride at the rate of 365.5 kg/h were added and the whole mixture was subjected to ammonization with gaseous ammonia at the rate of 111.1 kg/h. The reaction mixture was then dried and granulated yielding 1550 kg/h of a multicomponent mineral fertilizer of the NPK type containing 14.9% N, 14.9% $P_2O_5$ and 14.8% $K_2O$.

EXAMPLE II

In an overflow reactor a phosphate rock containing 31.5 per cent $P_2O_5$ was decomposed at the rate of 1000 kg/h using 3750 kg/h of an aqueous solution containing 13.36% sulfuric acid and 27.55% ammonium sulfate. Decomposition was carried out at 90° C and the reagents were fed to the reactor at such a flow rate that the retention time of the pulp in the reactor was 5 hours, which ensured at least 98 per cent decomposition of the phosphate rock. The phospho-gypsum formed in the decomposition step was filtered, washed and treated with ammonium carbonate to yield, after filtration and washing, 1100 kg/h of fertilizer chalk having a 70 per cent by weight $CaCO_3$ content and 3444 kg/h of an ammonium sulfate aqueous solution of 30 per cent by weight concentration. The said solution, after treatment with 501.2 kg/h of sulfuric acid and after addition of the distillation residue left after phosphoric salts formation (Liquor I) was charged to the phosphate rock decomposition step. The overall decomposition stream was filtered and the filtrate in the amount of 2387 kg/h, consisting mainly of the solution of ammonium sulfate and ammonium phosphate was divided into two streams, one of which, a partial phosphate salts plant stream (Liquor I) was delivered to a phosphoric salts plant at the flow rate of 360 kg/h, and the other, a partial fertilizer plant stream was charged to a multi-component fertilizer plant of the type NPK, at the flow rate of 2027 kg/h. To the partial phosphates plant stream sulfuric acid was added at the rate of 30.9 kg/h, the solution was adiabatically cooled and then a mixture of 70% by weight methanol and 30% by weight isopropanol at the flow-rate of 420.0 kg/h was introduced at 15° C for about 2 hours to effect the precipitation of salts.

Because of the high content of the sulfate ions in the alcoholic solution of the acid, 2.8 kg/h of chalk obtained in the conversion step was metered to the pulp. The mixture was separated by centrifugation and the aqueous alcoholic solution of phosphoric acid was neutralized with ammonia fed at the rate of 10.7 kg/h, yielding after centrifuging and drying 72.5 kg/h, of ammonium phosphate. The water-alcohol solution was separated by distillation and the alcohols were recycled to the precipitation step and the distillation residue left (water) in the amount of 195 kg/h was introduced, into the reaction solution in the phosphate feed - stock decomposition step.

The precipitate from the phosphate plant stream (Liquor I) at the rate of 111.3 kg/h and potassium chloride at the rate of 404.1 kg/h were charged to the fertilizer plant stream (Liquor II) and ammonized with gaseous ammonia at the rate of 30.3 kg/h. The reaction mass was dried and granulated to yield 1389.5 kg/h of a multi-component mineral fertilizer of NPK type, containing 13.1% N, 18.2% $P_2O_5$ and 18.4% $K_2O$.

We claim:

1. A process for the simultaneous manufacture of (a) phosphoric acid and (b) a multi-component mineral fertilizer of the NPK type comprising the steps of (1) decomposing crude phosphate rock with an aqueous solution containing ammonium sulfate and sulfuric acid in a molar ratio of about 0.7 to 1.0, whereby a first precipitate of phospho-gypsum is formed; (2) filtering off said first precipitate; (3) dividing the filtrate into two streams designated Liquor I and Liquor II; Liquor I comprising not more than 30 per cent by weight of the two streams; (4) adiabatically cooling Liquor I below 30° C; (5) adding a water miscible organic solvent to the cooled Liquor I below 30° C. in the volume ratio of from about 0.8 to 1.6 of solvent to Liquor I whereby a second precipitate comprising neutral ammonium sulfate and mineral impurities is formed; (6) filtering off said second precipitate to yield an organic solvent-aqueous solution filtrate containing phosphoric acid; (7) separating said organic solvent from said phosphoric acid by distillation; (8) treating Liquor II with potassium chloride, said second precipitate comprising ammonium sulfate, and gaseous ammonia to form an ammonized reaction mixture; and (9) drying and granulating said ammonized reaction mixture to form a multi-component fertilizer of the NPK type.

2. A process for the simultaneous manufacture of (a) phosphate salts and (b) a multi-component mineral fertilizer of the NPK type comprising the steps of (1) decomposing crude phosphate rock with an aqueous solution containing ammonium sulfate and sulfuric acid in a molar ratio of about 0.7 to 1.0, whereby a first precipitate of phospho-gypsum is formed; (2) filtering off said first precipitate; (3) dividing the filtrate into two streams designated Liquor I and Liquor II, Liquor I comprising not more than 30 per cent by weight of the two streams; (4) adiabatically cooling Liquor I below 30° C.; (5) adding a water miscible organic solvent to the cooled Liquor I below 30° C. in the volume ratio of from about 0.8 to 1.6 of solvent to Liquor I whereby a second precipitate comprising neutral ammonium sulfate and mineral impurities is formed; (6) filtering off said second precipitate to yield an organic solvent - aqueous solution filtrate containing phosphoric acid; (7) neutralizing said organic solvent-aqueous filtrate with a basic material selected from the group consisting of ammonia, alkali metal hydroxides and alkali metal carbonates to form crystalline phosphate salts; (8) filtering off said salts leaving a filtrate of organic solvent and water; (9) separating said organic solvent and water by distillation; (10) recycling said organic solvent to step (5) and said water to step (1); (11) treating Liquor II with potassium chloride, said second precipitate comprising ammonium sulfate, and gaseous ammonium to form an ammonized reaction mixture; and (12) drying and granulating said ammonized reaction mixture to form a multi-component fertilizer of the NPK type.

3. The process of claim 1 further comprising treating said phospho-gypsum with ammonium carbonate solution to form a precipitate of chalk and a 40% ammonium sulfate solution; filtering off said chalk and treating the filtrate with sulfuric acid to preserve a molar ratio of ammonium sulfate to sulfuric acid of from 0.7 to 1.0; and recycling said treated filtrate to step (1).

4. The process of claim 2 further comprising treating said phospho-gypsum with ammonium carbonate solution to form a precipitate of chalk and a 40% ammonium sulfate solution; filtering off said chalk and treating the filtrate with sulfuric acid to preserve a molar ratio of ammonium sulfate to sulfuric acid of from 0.7 to 1.0; and recycling said treated filtrate to step (1).

* * * * *